(12) United States Patent
Wakimoto et al.

(10) Patent No.: US 10,305,084 B2
(45) Date of Patent: May 28, 2019

(54) PRISMATIC SECONDARY BATTERY AND ASSEMBLED BATTERY USING THE SAME

(71) Applicants: Sanyo Electric Co., Ltd., Daito-shi, Osaka (JP); Panasonic Corporation, Kadoma-shi, Osaka (JP)

(72) Inventors: Ryoichi Wakimoto, Hyogo (JP); Kazuhiro Kitaoka, Hyogo (JP); Isao Fujiwara, Hyogo (JP); Hiromasa Yagi, Osaka (JP)

(73) Assignees: SANYO Electric Co., Ltd., Osaka (JP); Panasonic Corporation, Osaka (JP)

( * ) Notice: Subject to any disclaimer, the term of this patent is extended or adjusted under 35 U.S.C. 154(b) by 81 days.

(21) Appl. No.: 15/150,847

(22) Filed: May 10, 2016

(65) Prior Publication Data

US 2016/0336580 A1    Nov. 17, 2016

(30) Foreign Application Priority Data

May 15, 2015 (JP) ................................. 2015-099581

(51) Int. Cl.
*H01M 2/02* (2006.01)
*H01M 2/34* (2006.01)
*H01M 2/26* (2006.01)

(52) U.S. Cl.
CPC ......... *H01M 2/345* (2013.01); *H01M 2/0217* (2013.01); *H01M 2/266* (2013.01)

(58) Field of Classification Search
None
See application file for complete search history.

(56) References Cited

U.S. PATENT DOCUMENTS

| 2009/0004561 A1 | 1/2009 | Nansaka et al. |
| 2009/0239133 A1 | 9/2009 | Kosugi |
| 2012/0288751 A1 | 11/2012 | Kako et al. |

FOREIGN PATENT DOCUMENTS

| JP | 2008-226626 A | 9/2008 |
| JP | 2009-32640 A | 2/2009 |
| JP | 2013-186954 A | 9/2013 |
| JP | 2013-191352 A | 9/2013 |
| JP | 2013-214474 A | 10/2013 |

(Continued)

*Primary Examiner* — Tracy M Dove
(74) *Attorney, Agent, or Firm* — Westerman, Hattori, Daniels & Adrian, LLP

(57) ABSTRACT

An electrode body including a positive electrode plate and a negative electrode plate include a positive electrode tab portion at an end portion on a sealing plate side, a positive electrode collector electrically connected to the positive electrode plate include a collector body portion, a collector extension portion, a collector connection, and a collector connection portion. A pressure-sensitive current breaking mechanism includes a conductive member having an opening portion on an electrode body side, a deformation plate that seals the opening portion, and a collector body portion disposed on the electrode body side of the deformation plate and connected to the deformation plate. The collector extension portion is offset from the collector body portion and is disposed on the sealing plate side with respect to the collector body portion. Positive electrode tab portion is connected to the collector connection bent back at an end portion of the collector extension portion.

21 Claims, 15 Drawing Sheets

(56) References Cited

FOREIGN PATENT DOCUMENTS

| JP | 2013-218816 A | | 10/2013 |
|---|---|---|---|
| JP | 2013218816 A | * | 10/2013 |
| JP | 2013-242995 A | | 12/2013 |

* cited by examiner

PRISMATIC SECONDARY BATTERY AND ASSEMBLED BATTERY USING THE SAME

CROSS REFERENCE TO RELATED APPLICATIONS

The present invention application claims priority to Japanese Patent Application No. 2015-099581 filed in the Japan Patent Office on May 15, 2015, the entire contents of which are incorporated herein by reference.

BACKGROUND OF THE INVENTION

Field of the Invention

The present disclosure relates to a prismatic secondary battery and an assembled battery using the same.

Description of Related Art

Secondary batteries such as alkaline secondary batteries and nonaqueous electrolyte secondary batteries are used in power sources for driving electric vehicles (EV), hybrid electric vehicles (HEV, PHEV), and the like. In such applications, since a high capacity or a high input characteristics is required, a battery pack in which a plurality of prismatic secondary batteries are connected in series or in parallel is used.

In such prismatic, secondary batteries, a battery case is formed by a bottomed tubular prismatic outer package including an opening and a sealing plate that seals the opening. The battery case accommodates therein an electrode body including positive electrode plates, negative electrode plates, and separators, and an electrolyte. A positive electrode terminal and a negative electrode terminal are attached to the sealing plate. The positive electrode terminal is electrically connected to the positive electrode plates through a positive electrode collector, and the negative electrode terminal is electrically connected to the negative electrode plates through a negative electrode collector.

The positive electrode plate includes a positive electrode core body made of metal and a positive electrode active material layer formed on the surface of the positive electrode core body. A positive electrode core body exposed portion, on which no positive electrode active material layer is formed, is formed in a portion of the positive electrode core body. Furthermore, the positive electrode collector is connected to the positive electrode core body exposed portion. Furthermore, the negative electrode plate includes a negative electrode core body made of metal and a negative electrode active material layer formed on the surface of the negative electrode core body. A negative electrode core body exposed portion, on which no negative electrode active material layer is formed, is formed in a portion of the negative electrode core body. Furthermore, the negative electrode collector is connected to the negative electrode core body exposed portion.

For example, Japanese Published Unexamined Patent Application No. 2009-032640 (Patent Document 1) proposes a prismatic secondary battery using a wounded electrode body including a wounded positive electrode core body exposed portion at one end portion and a wounded negative electrode core body exposed portion at the other end portion. Furthermore, Japanese Published Unexamined Patent Application No. 2008-226625 (Patent Document 2) proposes a prismatic secondary battery that uses a wounded electrode body provided with a positive electrode core body exposed portion and a negative electrode core body exposed portion at one end portion.

BRIEF SUMMARY OF THE INVENTION

Development of on-vehicle secondary batteries, particularly, secondary batteries used in EVs and PHEVs that have a higher energy density and a larger battery capacity are awaited. In the case of the prismatic secondary battery disclosed in Patent Document 1 described above, spaces such as left and right spaces in which the wound positive electrode core body exposed portion and the wound negative electrode core body exposed portion are disposed and an upper space between the sealing plate and the wound electrode body are required in the battery case. Such a requirement is a factor hindering the increase in energy density of the second battery.

Conversely, as is the case of the prismatic secondary battery disclosed in Patent Document 2, when the wound electrode body provided with the positive electrode core body exposed portion and the negative electrode core body exposed portion at one end portion is used, it will be easier to obtain a prismatic secondary battery with a high energy density.

However, the structure of the collector of the prismatic secondary battery disclosed in Patent Document 2 described above tends to become more complex compared to that of the prismatic secondary battery disclosed in Patent Document 1.

The present disclosure provides a prismatic secondary battery and an assembled battery (a battery pack) using the prismatic secondary batteries, which is high in energy density and capacity and that is highly reliable.

A prismatic secondary battery according to an aspect of the present disclosure includes a positive electrode plate that includes a positive electrode tab portion, a negative electrode plate that includes a negative electrode tab portion, an electrode body that includes the positive electrode plate and the negative electrode plate, a prismatic outer package that includes an opening and that houses the electrode body, a sealing plate that seals the opening, a positive electrode terminal electrically connected to the positive electrode plate, the positive electrode terminal being attached to the sealing plate, a negative electrode terminal electrically connected to the negative electrode plate, the negative electrode terminal being attached to the sealing plate, and a pressure-sensitive current breaking mechanism provided in a conductive path between the positive electrode plate and the positive electrode terminal or in a conductive path between the negative electrode plate and the negative electrode terminal. In the prismatic secondary battery, the positive electrode tab portion and the negative electrode tab portion are disposed at an end portion of the electrode body on a sealing plate side, the current breaking mechanism includes a conductive member having an opening portion on an electrode body side, a deformation plate that seals the opening portion, and a collector that is connected to the deformation plate, the conductive path between the positive electrode plate and the positive electrode terminal or the conductive path between the negative electrode plate and the negative electrode terminal is disconnected upon breakage of a fragile portion caused by deformation of the deformation plate deforming when a pressure inside the battery is equivalent to or above a predetermined value, the collector includes a collector body portion that is disposed on the electrode body side of the deformation plate and that is connected to the deformation plate, a collector extension portion positioned on the sealing plate side with respect to the collector body portion, and a collector connection that is bent or bent back at an end portion of the collector extension portion, and the collector extension portion is disposed at a position offset with respect to the collector body portion in a longitudinal direction of the sealing plate.

In the above configuration, since the positive electrode tab portion of the positive electrode plate and the negative electrode tab portion of the negative electrode plate are disposed at the end portion of the electrode body on the sealing plate side, spaces in the prismatic outer package in which members that are not involved with generation of electricity are disposed can be reduced. Accordingly, a prismatic secondary battery that has a further higher energy density and that has a large battery capacity can be obtained.

Furthermore, in the above configuration, since the pressure-sensitive current breaking mechanism is provided, when the battery becomes overcharged, the overcharging can be prevented from progressing; accordingly, the battery becomes highly reliable.

In the above configuration, the collector includes the collector extension portion and the collector connection, and the collector extension portion is disposed at a position that is near to the sealing plate with respect to the collector body portion. Accordingly, the collector extension portion and the collector connection can be disposed in a space created next to the current breaking mechanism and, accordingly, a portion that is involved in generating electricity can be enlarged in the electrode body. Accordingly, the prismatic secondary battery becomes further higher in energy density.

Furthermore, with the above configuration, even if a considerably strong impact or vibration is added to the prismatic secondary battery and a load that pulls the tab portion towards the electrode body side is applied thereto, load can be suppressed from being added to the fragile portion that is to be the breaking portion, and the connection between the deformation plate and the collector body portion. Accordingly, the prismatic secondary battery becomes further reliable.

Desirably, the collector extension portion is disposed at a position offset with respect to the collector body portion in a longitudinal direction of the sealing plate.

Desirably, the collector connection is bent back at an end portion of the collector extension portion.

Desirably, an angle formed between opposing surfaces of the collector extension portion and the collector connection is 60° or smaller.

Desirably, the collector connection is bent at the end portion of the collector extension portion and extends towards the electrode body.

Desirably, the collector includes a collector connection portion that connects the collector body portion and the collector extension portion to each other, and the collector connection portion is inclined with respect to the collector body portion and is inclined with respect to the collector extension portion.

Desirably, an insulating member is disposed between the sealing plate and the conductive member, and the insulating member includes a wall disposed between the conductive member and the collector connection portion.

Desirably, an insulating member is disposed between the sealing plate and the collector extension portion, and the insulating member and the collector extension portion are fixed to each other.

Desirably, a fragile portion is provided in the collector body portion. Desirably, the fragile portion is formed in the collector body portion and around a connection between the collector body portion and the deformation plate. Furthermore, desirably, a thin wall portion or a groove portion is provided as the fragile portion. Note that the joint portion between the collector and the deformation plate may be the fragile portion. Alternatively, the fragile portion may be provided in the deformation plate.

A plurality of the prismatic secondary battery described above may be connected in series or in parallel such that a battery pack is formed.

The present disclosure is capable of providing a prismatic secondary battery and a battery pack using the prismatic secondary battery, which is high in energy density and capacity and that is highly reliable.

DETAILED DESCRIPTION OF THE INVENTION

Figure 1:
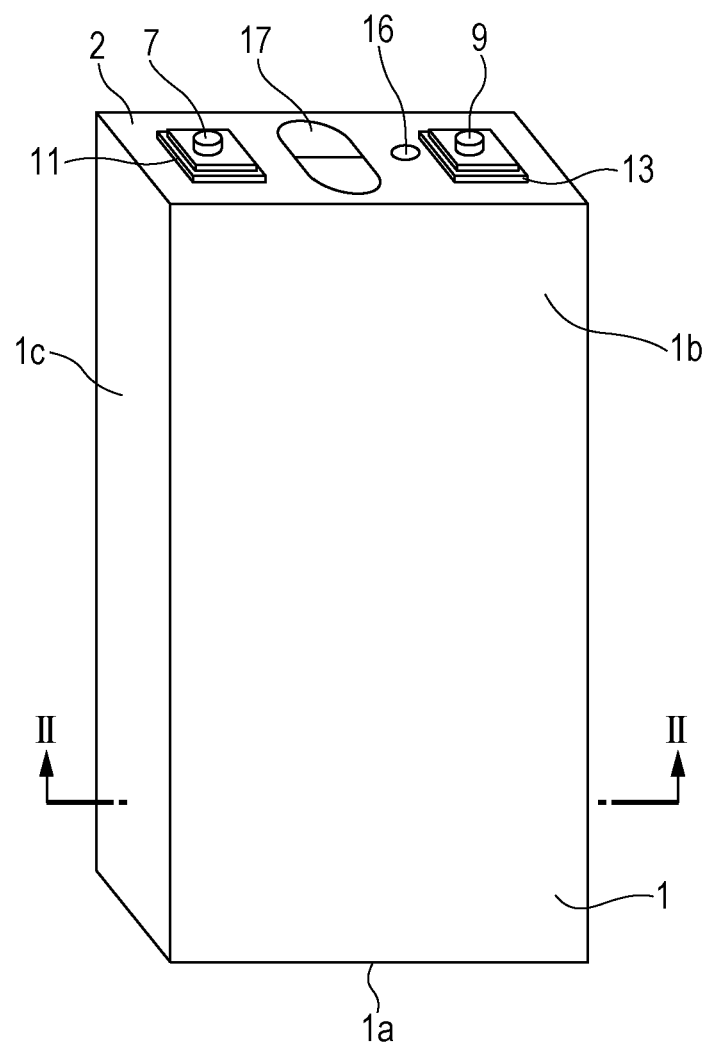
FIG. 1 is a perspective view of a prismatic secondary battery according to an exemplary embodiment.

Hereinafter, a configuration of a prismatic secondary battery 20 according to an exemplary embodiment will be described. Note that the present disclosure is not limited to the following exemplary embodiment.

As illustrated in FIGS. 1 to 5, the prismatic secondary battery 20 includes a prismatic outer package 1 that has an opening, and a sealing plate 2 that seals the opening. The prismatic outer package 1 and the sealing plate 2 are desirably made of metal and, for example, may be made of aluminum or an aluminum alloy. The prismatic outer package 1 includes a bottom 1a, a pair of large-area side walls 1b, and a pair of small-area side walls 1c. The area of each large-area side wall is larger than the area of each small-area side wall. The prismatic outer package 1 is a bottomed and tubular prismatic outer package having a rectangular shape and includes the opening at a position facing the bottom 1a. A stacked electrode body 3 in which a plurality of positive electrode plates and a plurality of negative electrode plates are stacked with separators interposed therebetween are accommodated in the prismatic outer package 1 together with an electrolyte. Each positive electrode plate includes a positive electrode core body made of metal and positive electrode active material layers that include as positive electrode active material and that are formed on the positive electrode core body. Each positive electrode plate includes, at one of its end, a positive electrode core body exposed portion 4b in which the positive electrode core body is exposed. Desirably, an aluminum foil or an aluminum alloy foil is used for the positive electrode core body. Each negative electrode plate includes a negative electrode core body made of metal and negative electrode active material layers that include a negative electrode active material and that are formed on the negative electrode core body. Each negative electrode plate includes, at one of its end, a negative electrode core body exposed portion 5b in which the negative electrode core body is exposed. Desirably, a copper foil or a copper alloy foil is used for the negative electrode core body. In the prismatic secondary battery 20, each positive electrode core body exposed portion 4b constitutes a positive electrode tab portion 4c, and each negative electrode core body exposed portion 5b constitutes a negative electrode tab portion 5c.

As illustrated in FIGS. 2 to 5, at an end portion on the sealing plate 2 side of the electrode body 3, positive electrode tab portions 4c are disposed in a stacked state and the negative electrode tab portions 5c are disposed in a stacked state. A positive electrode collector 6 is joined to the stacked positive electrode tab portions 4c. Furthermore, a positive electrode terminal 7 is electrically connected to the positive electrode collector 6. A negative electrode collector 8 is joined to the stacked negative electrode tab portions 5c. Furthermore, a negative electrode terminal 9 is electrically connected to the negative electrode collector 8. A pressure-sensitive current breaking mechanism 40 is provided in the conductive path between the positive electrode plates and the positive electrode terminal 7. The current breaking mechanism 40 is disposed between the sealing plate 2 and the electrode body 3. The current breaking mechanism 40 is activated when the pressure inside the battery becomes equivalent to or higher than a predetermined value, and the current is cut off by cutting off the conductive path between the positive electrode plates and the positive electrode terminal 7. Note that the pressure-sensitive current breaking mechanism 40 may be provided in the conductive path between the negative electrode plates and the negative electrode terminal 9.

The positive electrode terminal 7 is attached to the sealing plate 2 in an electrically insulated state with the sealing plate 2 with an insulating member 10 and an insulating gasket 11.

The negative electrode terminal 9 is attached to the sealing plate 2 in an electrically insulated state with the sealing plate 2 with an insulating member 12 and an insulating gasket 13. The insulating members 10 and 12, and the gaskets 11 and 13 are desirably made of resin.

The electrode body 3 is accommodated inside the prismatic outer package 1 while being covered by an insulation sheet 14. Desirably, the insulation sheet 14 is folded in a box shape or is bag shaped. The sealing plate 2 is joined to an opening edge portion of the prismatic outer package 1 by, for example, laser welding. The sealing plate 2 includes an electrolyte injection hole 15, and the electrolyte injection hole 15 is sealed with a sealing plug 16 after injection of the electrolyte. A gas discharge valve 17 is formed in the sealing plate 2. The gas discharge valve 17 is activated when the pressure inside the battery becomes equivalent to or higher than a predetermined value and is for discharging gas inside the battery to the outside of the battery. Note that the pressure in which the gas discharge valve 17 is activated is set higher than the pressure in which the current breaking mechanism 40 is activated.

The size of the prismatic secondary battery 20 may be, for example, 18 cm in height (a length in a direction orthogonal to the sealing plate 2. The length in the up-down direction in FIG. 1), 3 cm in thickness (a length in the front-rear direction in FIG. 1), and 9 cm in width (a length in a direction that is parallel to the sealing plate 2 and that is orthogonal to the thickness direction of the prismatic secondary battery 20. The left-right direction in FIG. 1). Note that the present disclosure is especially effective when the height of the prismatic secondary battery is twice or more of the width of the prismatic secondary battery. The present disclosure is especially effective when the width of the prismatic secondary battery is 10 cm or smaller and the height of the prismatic secondary battery is 17 cm or larger. Furthermore, the present disclosure is especially effective when the battery capacity is 30 Ah or more. Note that the value of the battery capacity may be the value of the design capacity, that is, the value of the battery capacity may be the nominal capacity specified by the manufacturer of the battery.

Subsequently, a method for manufacturing the prismatic secondary battery 20 will be described.

[Fabrication of the Positive Electrode Plates]

A positive electrode slurry containing lithium cobalt oxide as the positive electrode active material, polyvinylidene fluoride (PVdF) as a binding agent, a carbon material as a conductive material, and N-methylpyrrolidone (NMP) is fabricated. The positive electrode slurry is coated on both surfaces of a rectangular aluminum foil that is 15 μm thick and that serves as the positive electrode core body. Subsequently, by drying the above, the N-methylpyrrolidone in the positive electrode slurry is removed and the positive electrode active material layers are formed on the positive electrode core body. Subsequently, a compression process is performed to compress the positive electrode active material layers to a predetermined thickness. The positive electrode plate obtained in the above manner is cut into a predetermined shape.

[Fabrication of the Negative Electrode Plates]

A negative electrode slurry containing graphite as the negative electrode active material, styrene-butadiene rubber (SBR) as the binding agent, carboxymethyl cellulose (CMC) as a thickener, and water is fabricated. The negative electrode slurry is coated on both surfaces of a rectangular copper foil that is 8 μm thick and that serves as the negative electrode core body. Subsequently, by drying the above, the water in the negative electrode slurry is removed and the negative electrode active material layers are formed on the negative electrode core body. Subsequently, a compression process is performed to compress the negative electrode active material layers to a predetermined thickness. The negative electrode plate obtained in the above manner is cut into a predetermined shape.

Figure 6A:
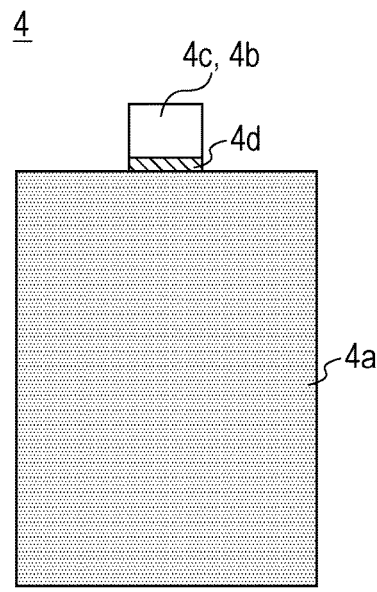
FIGS. 6A and 6B are plan views of a positive electrode plate and a negative electrode plate according to the exemplary embodiment.
Figure 6B:
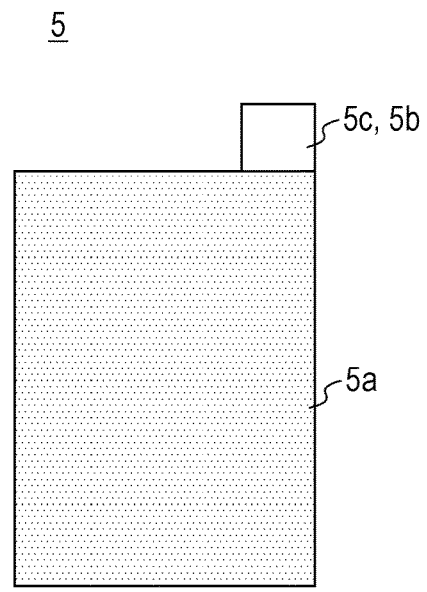

FIG. 6A is a plan view of a positive electrode plate 4 after cutting, and FIG. 6B is a plan view of a negative electrode plate 5 after cutting. The positive electrode plate 4 includes rectangular areas that are positive electrode active material layers 4a formed on both surfaces of the positive electrode core body, and the positive electrode core body exposed portion 4b serving as the positive electrode tab portion 4c is formed on one side of the positive electrode plate 4. The negative electrode plate 5 includes rectangular areas that are negative electrode active material layers 5a formed on both surfaces of the negative electrode core body, and the negative electrode core body exposed portion 5b serving as the negative electrode tab portion 5c is formed on one side of the negative electrode plate 5. Note that the size of the positive electrode plate 4 is slightly smaller than the size of the negative electrode plate 5. Desirably, an insulating layer or a protective layer 4d that has an electric resistance that is higher than that of the positive electrode core body is provided at the base portion of the positive electrode tab portion 4c. Note that conductive members other than the above may be connected to the positive electrode core body exposed portion 4b and the negative electrode core body exposed portion 5b to serve as the positive electrode tab portion 4c and the negative electrode tab portion 5c, respectively.

[Fabrication of the Stacked Electrode Body]

Figure 7:
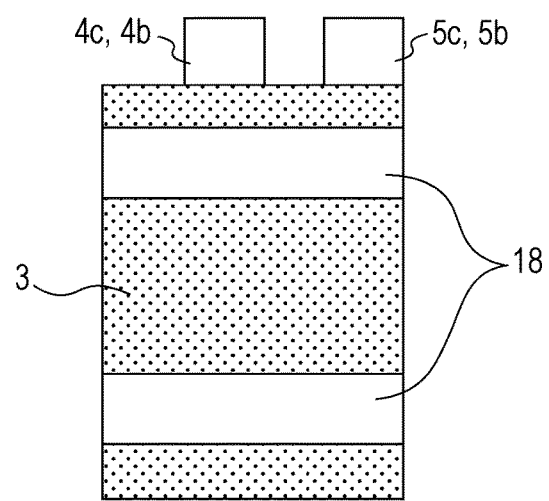
FIG. 7 is a plan view of a multilayered electrode assembly according to the exemplary embodiment.

The electrode body 3 is fabricated by fabricating 100 pieces of positive electrode plates 4 and 101 pieces of negative electrode plates 5 with the above methods and by stacking each positive electrode plate 4 and each negative electrode plate 5 on each other with a rectangular polyolefin separator therebetween. As illustrated in FIG. 7, the stacked electrode body 3 is fabricated such that the positive electrode tab portions 4c of the positive electrode plates 4 and the negative electrode tab portions 5c of the negative electrode plates 5 are stacked at one end portion of the electrode body 3. Desirably, separators are disposed on both outer surfaces of the stacked electrode body 3 and the electrode plates and the separators are fixed with tapes 18 and the like in a stacked state. Alternatively, an adhesion layer may be provided on each separator such that the separators and the positive electrode plates 4, and the separators and the negative electrode plates 5 are adhered to each other. Note that the size of the separator in plan view is the same or larger than the size of the negative electrode plate 5. Each positive electrode plate 4 may be disposed between two separators and after heat welding the outer peripheral of the separators, each of the positive electrode plates 4 and each of the negative electrode plates 5 may be stacked on each other.

<Assembling the Current Breaking Mechanism>

Figure 2:
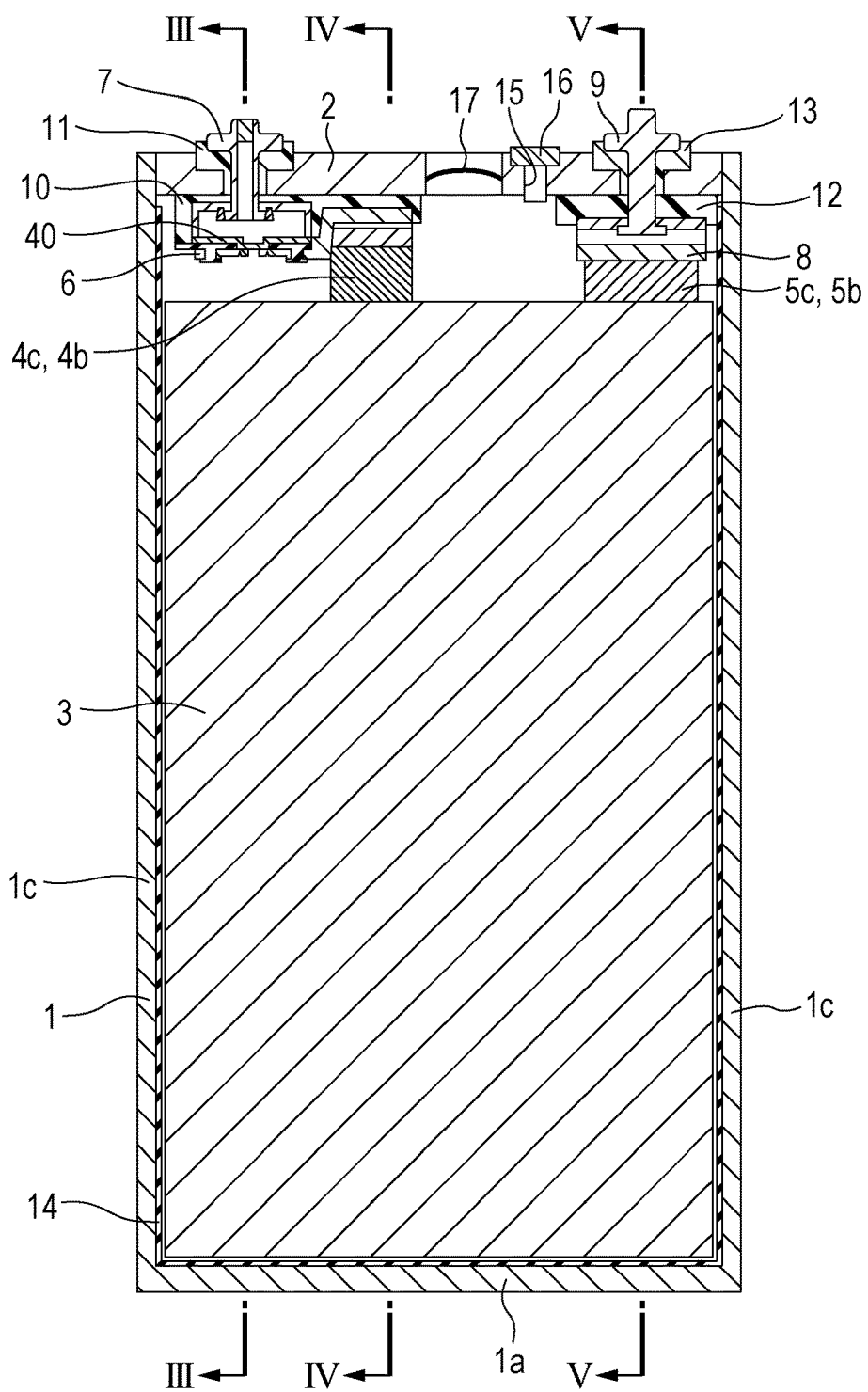
FIG. 2 is a cross-sectional view taken along line II-II in FIG. 1.
Figure 3:
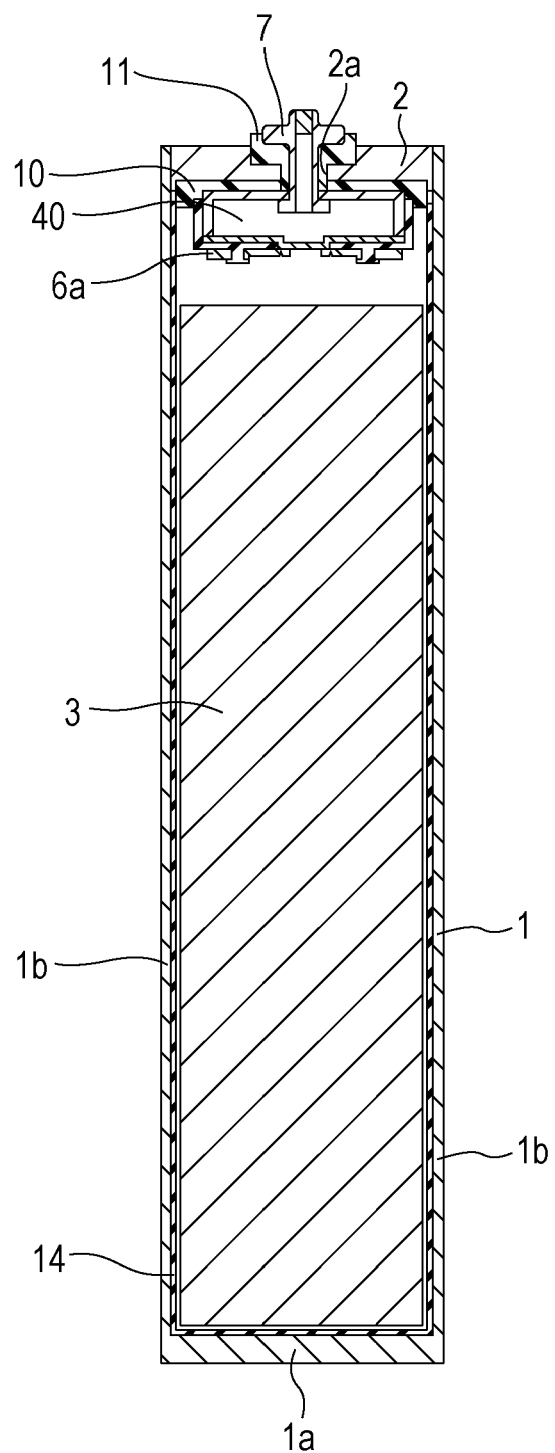
FIG. 3 is a cross-sectional view taken along line III-III in FIG. 2.
Figure 4:
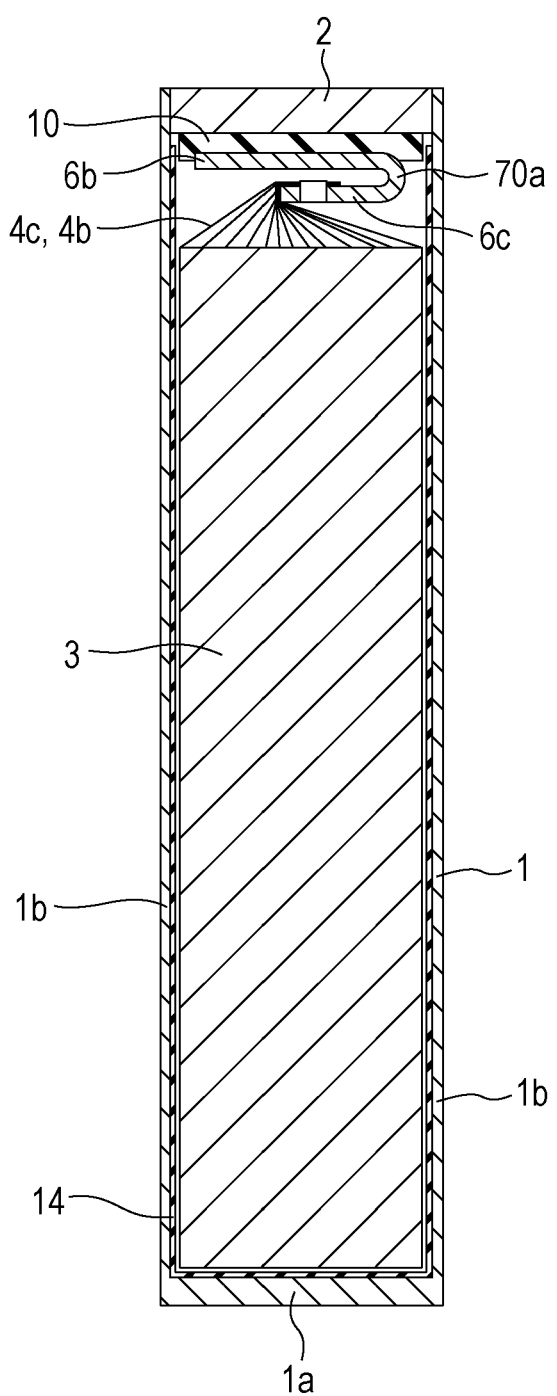
FIG. 4 is a cross-sectional view taken along line IV-IV in FIG. 2.
Figure 5:
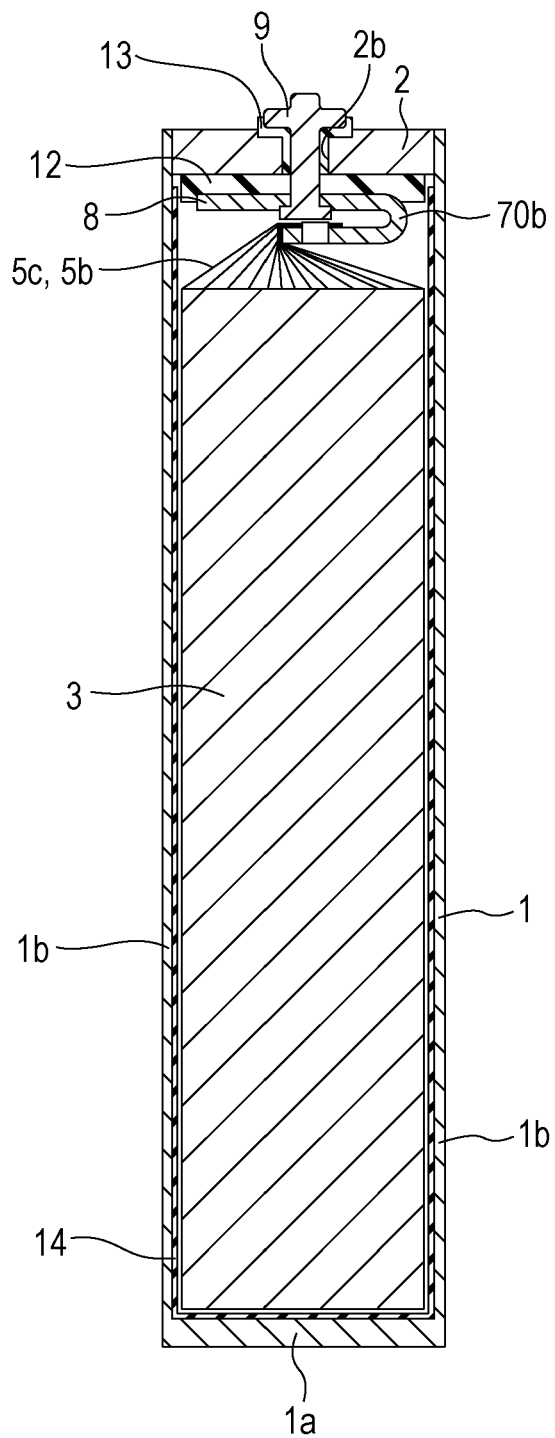
FIG. 5 is a cross-sectional view taken along line V-V in FIG. 2.
Figure 8:
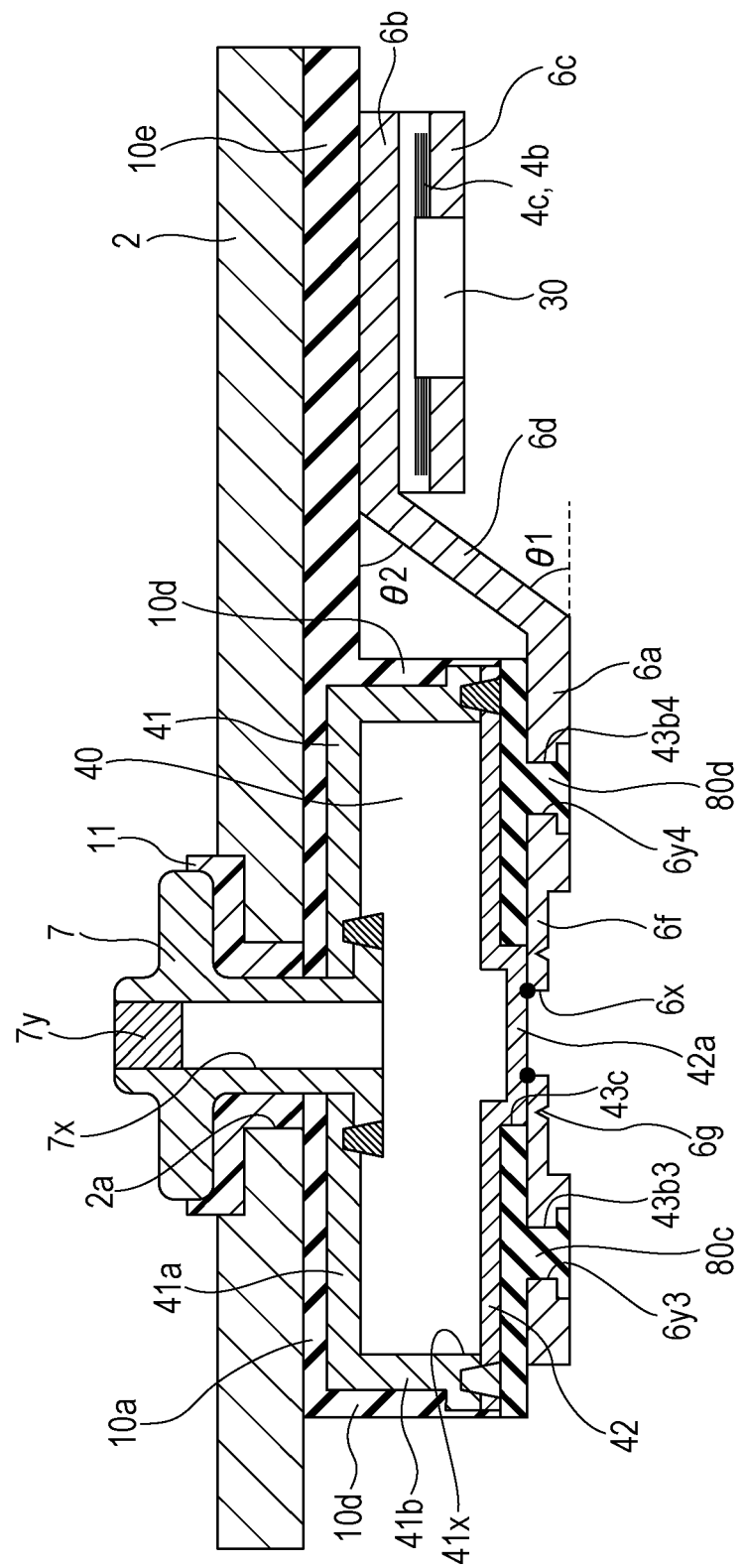
FIG. 8 is an enlarged view of a portion around the current breaking mechanism in FIG. 2.
Figure 9:
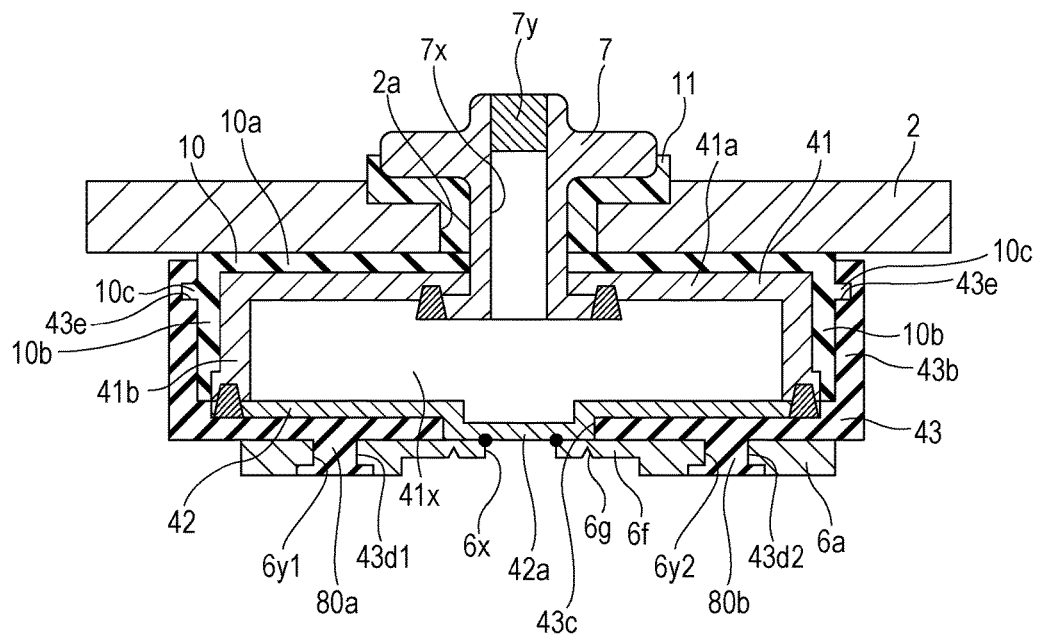
FIG. 9 is an enlarged view of a portion around the current breaking mechanism in FIG. 3.

FIG. 8 is an enlarged view of a portion around the current breaking mechanism 40 in FIG. 2. FIG. 9 is an enlarged view of a portion around the current breaking mechanism 40 in FIG. 3. The method of attaching the positive electrode terminal 7 to the sealing plate 2, and the method of assembling the current breaking mechanism 40 will be described next.

A positive electrode terminal mounting hole 2a is formed in the sealing plate 2. The gasket 11 is disposed on the battery external surface side of the positive electrode terminal mounting hole 2a, and the insulating member 10 and a conductive member 41 are disposed on the battery internal surface side. The positive electrode terminal 7 is inserted from the external side of the battery through the through-holes formed in the gasket 11, the sealing plate 2, the insulating member 10, and the conductive member 41, and the tip of the positive electrode terminal 7 is riveted on the conductive member 41. Note that the riveted portion of the positive electrode terminal 7 is desirably connected to be conductive member 41 by welding.

Desirably, the conductive member 41 has a cup-shape that includes an opening portion 41x open towards the electrode body 3 side. The conductive member 41 includes a base portion 41a that is disposed parallel to the sealing plate 2, and a cylindrical portion 41b that extends from the base portion 41a towards the electrode body 3 side. The cylindrical portion 41b may have a cylindrical shape or may be a rectangular tubular portion. The conductive member 41 is made of metal and, desirably, is made of aluminum or an aluminum alloy. The positive electrode terminal 7 is connected to the base portion 41a. Note that the positive electrode terminal 7 and the conductive member 41 may be an integral component. In such a case, the positive electrode terminal 7 is inserted into the through-holes of the components from the interior side of the battery and is riveted on the external side of the battery.

As illustrated in FIG. 9, the insulating member 10 includes an insulating member body portion 10a disposed between the sealing plate 2 and the base portion 41a of the conductive member 41, and a pair of insulating member first side walls 10b that extend from the two end portions of the insulating member body portion 10a in the short direction of the sealing plate 2 towards the electrode body 3 side. A protrusion 10c is formed on the outer surface of each insulating member first side wall 10b. Furthermore, as illustrated in FIG. 8, the insulating member 10 includes a pair of insulating member second side walls 10d that extend from the two end portions of the insulating member body portion 10a in the longitudinal direction of the sealing plate 2 towards the electrode body 3 side.

Subsequently, a deformation plate 42 is disposed so as to close the opening portion 42x of the conductive member 41 on the electrode body 3 side, and the outer peripheral edge of the deformation plate 42 is joined to the conductive member 41 by laser welding or the like. With the above, the opening portion of the conductive member 41 on the electrode body 3 side is sealed in an airtight manner. The deformation plate 42 is made of metal and, desirably, is made of aluminum or an aluminum alloy.

Subsequently, an insulating plate 43 serving as an insulating member is disposed on the surface of the deformation plate 42 on the electrode body 3 side. The insulating plate 43 includes an insulating plate body portion 43a disposed between the deformation plate 42 and a collector body portion 6a of the positive electrode collector 6, and a pair of insulating plate first side walls 43b that extend from two edge portions of the insulating plate body portion 43a in a short direction of the sealing plate 2 towards the sealing plate 2 side. An insulating plate through-hole 43c, a first projection 43d1, a second projection 43d2, a third projection 43d3, and a fourth projection 43d4 are formed in the insulating plate body portion 43a. Furthermore, recesses 43e are formed in the inner surface of the insulating plate first side walls 43b.

A projection 42a formed in the middle portion of the deformation plate 42 is inserted into the insulating plate through-hole 43c formed in the insulating plate body portion 43a. Furthermore, the inner surfaces of the insulating plate first side walls 43b are disposed so as to face the outer surfaces of the insulating member first side walls 10b. Furthermore, by fitting the protrusions 10c and the recesses 43e to each other, the insulating member 10 and the insulating plate 43 are connected to each other. Note that the recesses 43e may be through-holes.

Figure 10:
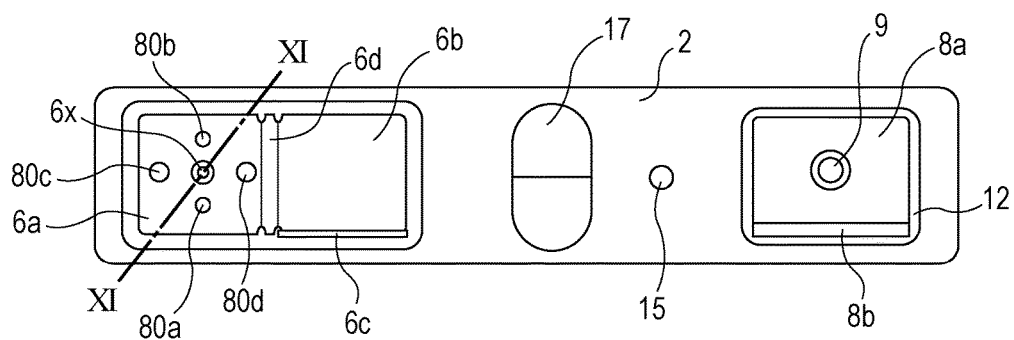
FIG. 10 is a diagram of a battery internal surface side of a sealing plate in which the positive electrode collector and the negative electrode collector have been installed.
Figure 11:
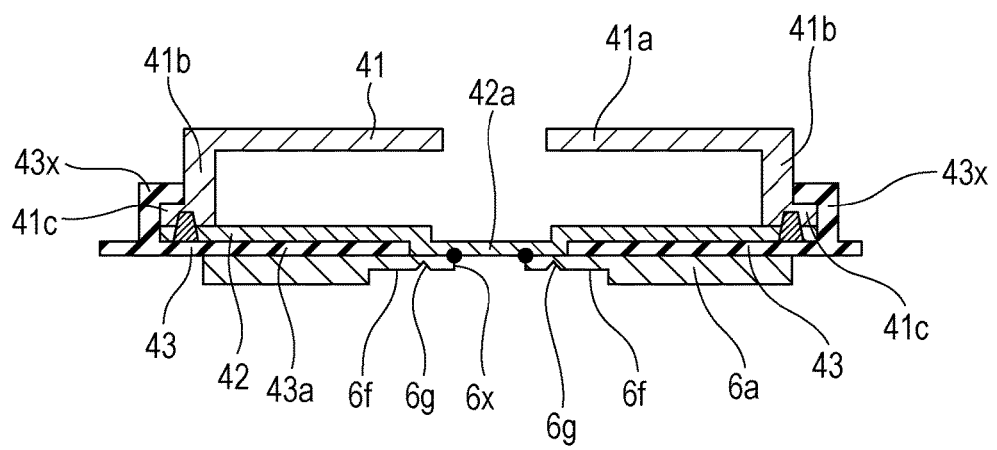
FIG. 11 is a cross-sectional view taken along line XI-XI in FIG. 10 and illustrates only a conductive member, a deformation plate, and a positive electrode collector.

FIG. 10 illustrates a lower surface of the sealing plate 2 inside the battery, in which the positive electrode terminal 7, the current breaking mechanism 40, the negative electrode collector 8, and the negative electrode terminal 9 are attached to the sealing plate 2. FIG. 11 is a cross-sectional view taken along line XI-XI in FIG. 10 and selectively illustrates only the conductive member 41, the deformation plate 42, and the insulating plate 43. As illustrated in FIG. 11, desirably, conductive member fixing portions 43x are provided in the insulating plate 43. Furthermore, desirably, the insulating plate 43 is fixed to the conductive member 41 by hooking the conductive member fixing portions 43x to flange portions 41c of the conductive member 41.

Desirably, the insulating plate 43 is directly or indirectly fixed to the conductive member 41. As a method of directly fixing the insulating plate 43 and the conductive member 41 to each other, as described above, the conductive member fixing portions may be provided in the insulating plate 43 and the conductive member fixing portions may be fixed to the conductive member 41. Furthermore, as a method of indirectly fixing the insulating plate 43 and the conductive member 41 to each other, as described above, the insulating plate 43 and the conductive member 41 may be fixed to each other through the insulating member 10. Since the conductive member 41 and the insulating member 10 are fixed to the sealing plate 2 in an integrated manner with the positive electrode terminal 7, the conductive member 41 and the insulating member 10 are fixed to each other. Furthermore, the insulating member 10 and the insulating plate 43 are fixed to each other by being fitted to each other. Accordingly, the insulating plate 43 and the conductive member 41 are fixed to each other through the insulating member 10. Note that the insulating plate 43 may be directly connected to the conductive member 41 only or may be indirectly connected to the conductive member 41 only.

Figure 13:
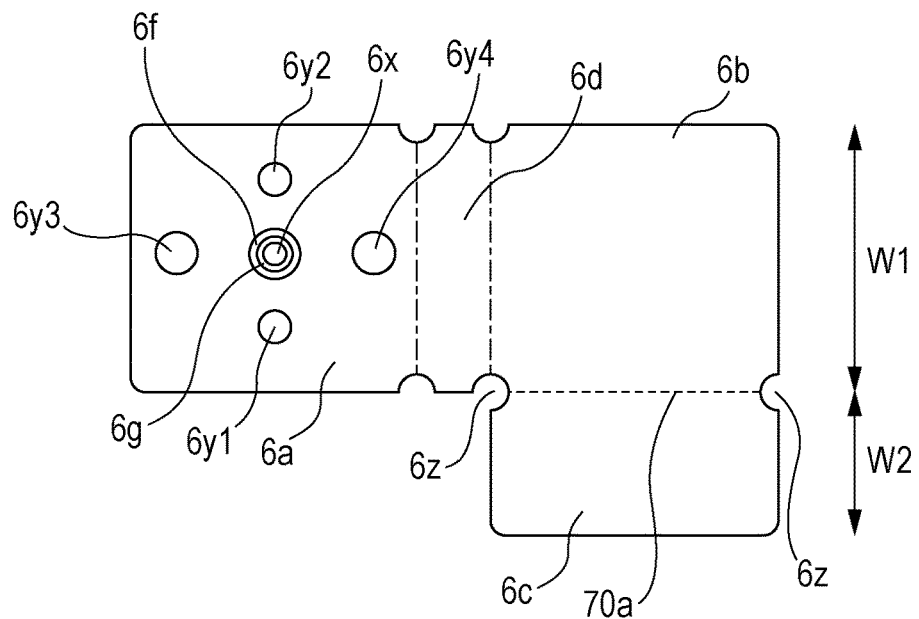
FIG. 13 is a plan view of a positive electrode collector according to the exemplary embodiment before bending.

A configuration of the positive electrode collector 6 will be described herein. FIG. 13 is a plan view of the positive electrode collector 6 before bending, and illustrates a surface thereof on the electrode body 3 side. The positive electrode collector 6 includes the collector body portion 6a, a collector extension portion 6b, a collector connection 6c, and a collector connection portion 6d. The broken lines are portions that are to be bending lines or bending-back lines. A through-hole 6x for connection is formed at the center of the collector body portion 6a and a thin wall portion 61 is formed around the through-hole 6x for connection. Furthermore, an annular groove portion 6g is provided inside the thin wall portion 6f so as to surround the through-hole 6x for connection. The thickness (the residual thickness) of the groove portion 6g is smaller than that of the thin wall portion 6f. Note that the annual groove portion 6g is a fragile portion and is broken upon deformation of the deformation plate 42. In other words, the fragile portion is the portion to be broken. Note that since it is only sufficient that the conductive path is disconnected upon breakage of the fragile portion, both of the thin wall portion 6f and the groove portion 6g do not have to be provided. Only the thin wall portion 6f or only the groove portion 6g may be provided. Alternatively, the joint portion between the deformation plate 42 and the collector body portion 6a of the positive electrode collector 6 may be a fragile portion without providing the thin wall portion 6f or the groove portion 6g. Alternatively, the fragile portion, such as the thin wall portion or a groove portion, may be provided in the deformation plate 42.

A first through-hole 6y1 for fixing, a second through-hole 6y2 for fixing, a third through-hole 6y3 for fixing, and a fourth through-hole 6y4 for fixing are provided in the collector body portion 6a, Furthermore, cutaways 6z are formed at both ends of the bending-back portion 70a.

Figure 14:
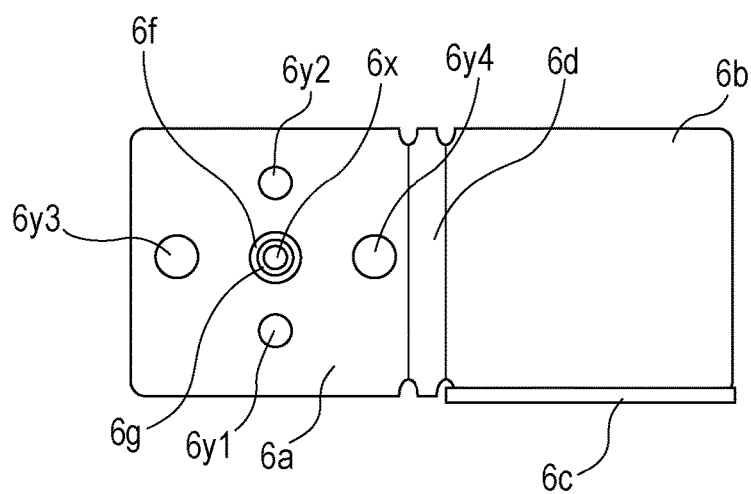
FIG. 14 is a plan view of a positive electrode collector according to the exemplary embodiment after bending.

FIG. 14 is a plan view of the positive electrode collector 6 after bending, and illustrates a surface thereof on the electrode body 3 side. The collector connection portion 6d is bent towards the near side of the drawing with respect to the collector body portion 6a, and the collector connection portion 6d is inclined with respect to the collector body portion 6a. Furthermore, the collector extension portion 6b is bent towards the far side of the thawing with respect to the collector connection portion 6d, and the collector connection portion 6d is inclined with respect to the collector extension portion 6b. The collector connection 6c is bent at substantially 90° (70 to 110°, for example) against the collector extension portion 6b.

In the short direction of the sealing plate 2, desirably, a length W2 of the collector connection 6c is shorter than the length W1 of the collector extension portion 6b. Furthermore, desirably, the relationship between the length W2 of the collector connection 6c and the length W1 of the collector extension portion 6b satisfies ⅓≤W2/W1≤⅔. With the above, variation in the lengths of the positive electrode tab portions 4c from the connection between the positive electrode tab portions 4c and the collector connection 6c to the positive electrode plates can be made small.

The positive electrode collector 6 illustrated in FIG. 14 is disposed on the surface of the insulating plate 43 on the electrode body 3 side. In so doing, the first projection 43d1, the second projection 43d2, the third projection 43d3, and the fourth projection 43d4 formed in the insulating plate 43 are respectively inserted into the first through-hole 6y1 for fixing, the second through-hole 6y2 for fixing, the third through-hole 6y3 for fixing, and the fourth through-hole 6y4 for fixing formed in the positive electrode collector 6. Subsequently, by expanding the diameters of the tips of the first projection 43d1, the second projection 43d2, the third projection 43d3, and the fourth projection 43d4, the positive electrode collector 6 is fixed to the insulating plate 43. With the above, a first fixed portion 80a, a second fixed portion 80b, a third fixed portion 80c, and a fourth fixed portion 80d are formed. Note that the projections may be press-fitted into the through-holes for fixing. Subsequently, gas is sent in through a terminal through-hole 7x formed in the positive electrode terminal 7 from the external side of the battery, such that the deformation plate 42 is urged against the collector body portion 6a of the positive electrode collector 6. In the above state, the edge portion of the through-hole 6x for connection provided in the collector body portion 6a and the deformation plate 42 are joined together by laser welding or the like. Note that the through-hole 6x for connection is not an essential configuration and a collector body portion 6a that has no through-hole 6x for connection may be joined to the deformation plate 42. Note that the terminal through-hole 7x is sealed with a plug 7y.

As illustrated in FIG. 8, the collector body portion 6a of the positive electrode collector 6 is disposed on the electrode body side of the positive electrode terminal 7, the conductive member 41, and the deformation plate 42. In other words, the positive electrode terminal 7, the conductive member 41, the deformation plate 42, and the collector body portion 6a are disposed so as to be arranged in the direction orthogonal to the sealing plate 2. The collector extension portion 6b of the positive electrode collector 6 is disposed on the sealing plate 2 side with respect to the collector body portion 6a. In other words, the distance between the collector body portion 6a and the sealing plate 2 is larger than the distance between the collector extension portion 6b and the sealing plate 2. Furthermore, the collector extension portion 6b of the positive electrode collector 6 is, in the longitudinal direction of the sealing plate 2, disposed more near to the center of the sealing plate 2 with respect to the collector body portion 6a. The collector body portion 6a and the collector extension portion 6b are connected by the collector connection portion 6d. The collector connection portion 6d is disposed so as to be inclined with respect to both the collector body portion 6a and the collector extension portion 6b.

<Installing the Negative Electrode Terminal in the Sealing Plate>

A negative electrode terminal mounting hole 2b is formed in the sealing plate 2. The gasket 13 is disposed on the battery external surface side of the negative electrode terminal mounting hole 2b, and the insulating member 12 and the negative electrode collector 8 are disposed on the battery internal surface side. In the above, the negative electrode collector 8 in which a collector connection 8b has been bent in advance at substantially 90° against a collector body portion 8a is used. The negative electrode terminal 9 is inserted from the external side of the battery through the through-holes formed in the gasket 13, the sealing plate 2, the insulating member 12, and the negative electrode collector 8, and the tip of the negative electrode terminal 9 is riveted on the negative electrode collector 8. Furthermore, the riveted portion of the negative electrode terminal 9 is connected to the negative electrode collector 8 by welding.

<Connecting the Tab Portions and the Collector to Each Other>

Figure 15:
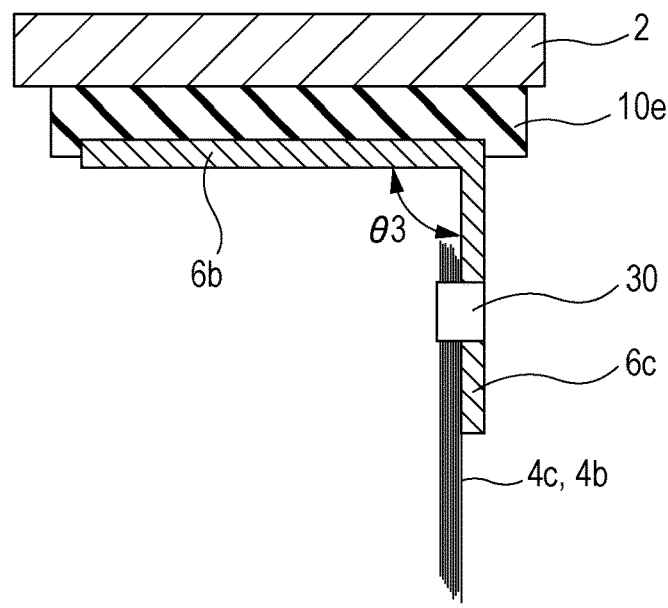
FIG. 15 is an enlarged view around the positive electrode tab portions in FIG. 4, and is a diagram illustrating the process of connecting the positive electrode tab portions to the positive electrode collector.

As illustrated in FIG. 15, the stacked positive electrode tab portions 4c are disposed on the collector connection 6c of the positive electrode collector 6, and the stacked positive electrode tab portions 4c and the collector connection 6c are joined to each other. With the above, the joint portion 30 is formed. Note that the positive electrode tab portions 4c can be joined to each other in advance before connecting the stacked positive electrode tab portions 4c to the positive electrode collector 6. The joining method is not limited to any method in particular and, for example, resistance welding, ultrasonic welding, welding with a high energy ray such as a laser may be used. It is particularly desirable to use resistance welding. Furthermore, a receiving component may be disposed on a surface of the stacked positive electrode tab portions 4c that is a surface on the other side of the outermost surface of the stacked positive electrode tab portions 4c in the stacking direction on which the collector connection 6c is disposed, and joining may be performed while the stacked positive electrode tab portions 4c are held in between the collector connection 6c and the receiving component.

The negative electrode tab portions 5c and the collector connection 8b of the negative electrode collector 8 are connected to each other with a similar method used on the positive electrode side.

Figure 12:
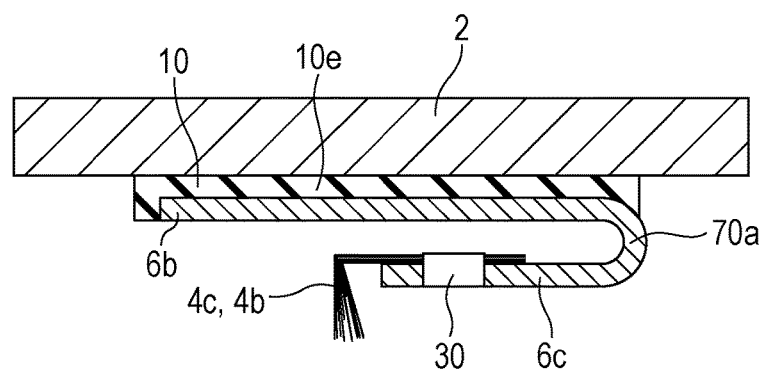
FIG. 12 is an enlarged view of a portion around the positive electrode tab portions in FIG. 4.

Subsequently, as illustrated in FIG. 12, the positive electrode collector 6 is further bent so that the collector connection 6c of the positive electrode collector 6 is bent back with respect to the collector extension portion 6b. The same as above applies to the negative electrode side as well, and the collector connection 8b of the negative electrode collector 8 is further bent with respect to the collector body portion 8a. With the above, the collector connection 8b is bent back with respect to the collector body portion 8a.

<Assembling the Prismatic Secondary Battery>

The electrode body 3 that is connected to the sealing plate 2 is disposed inside the insulation sheet 14 formed in a box shape and is inserted into the prismatic outer package 1. Subsequently, the sealing plate 2 and the prismatic outer package 1 is joined together by laser welding or the like and the opening of the prismatic outer package 1 is sealed. After the above, nonaqueous electrolyte containing an electrolyte solvent and electrolyte salt is injected through the electrolyte injection hole 15 provided in the sealing plate 2. Subsequently, the electrolyte injection hole 15 is sealed with the sealing plug 16.

Note that an insulation sheet is desirably disposed between the sealing plate 2 and the electrode body 3 to reliably insulate the electrode body 3 (especially the positive electrode tab portions 4c and the negative electrode tab portions 5c) and the sealing plate 2 from each other. For example, a portion of the insulation sheet 14 can be disposed between the sealing plate 2 and the electrode body 3. Alternatively, an insulation sheet different from the insulation sheet 14 can be disposed between the sealing plate 2 and the electrode body 3. Furthermore, an insulating plate that has a thickness that is larger than that of the insulation sheet 14 can be disposed.

<Prismatic Secondary Battery 20>

In the prismatic secondary battery 20, the positive electrode tab portions 4c and the negative electrode to portions 5c are disposed on an end portion of the electrode body 3 on the sealing plate 2 side. Accordingly, spaces in the prismatic outer package 1 in which members that are not involved with generation of electricity are disposed can be reduced such that a prismatic secondary battery that is high in energy density is obtained. Furthermore, in the prismatic secondary battery 20, the sealing plate 2 is disposed on a surface that has the smallest area among the six surfaces of the battery case constituted by the prismatic outer package 1 and the sealing plate 2. In other words, the area of each of the sealing plate 2 and the bottom 1a of the prismatic outer package 1 is smaller than the area of each of the four side walls (the pair of large-area side walls 1b and the pair of small-area side walls 1c) of the prismatic outer package 1. Accordingly, the prismatic secondary battery becomes further higher in energy density. However, as regards the prismatic outer package 1 used in the prismatic secondary battery 20, a bottomed tubular prismatic outer package may be used in which the position corresponding to the opening includes a side wall and the position corresponding to the small-area side wall 1c includes an opening, and the opening may be sealed with a sealing plate.

The prismatic secondary battery 20 is configured as a prismatic secondary battery having a high energy density by disposing the connection between the positive electrode collector 6 and the positive electrode tab portions 4c in the space formed next to the current breaking mechanism 40. Furthermore, the connection between the positive electrode collector 6 and the positive electrode tab portions 4c are disposed at a position offset from the collector body portion 6a in the longitudinal direction of the sealing plate 2. Accordingly, even if there is force pulling the positive electrode tab portions 4c towards the electrode body 3 side, load to the fragile portion formed in the collector body portion 6a and the connection between the deformation plate 42 and the collector body portion 6a can be suppressed such that the fragile portion and the connection between the deformation plate 42 and the collector body portion 6a can be prevented from becoming damaged or broken. Furthermore, since the collector connection portion 6d is formed, load can be absorbed and the fragile portion and the connection between the deformation plate 42 and the collector body portion 6a can be prevented, in a more effective manner, from becoming damaged or broken. Note that a bending angle θ1 of the collector connection portion 6d against the collector body portion 6a and the bending angle θ2 of the extension portion 6b against the connection portion 6d that are illustrated in FIG. 8 are preferably under 85° and, more preferably, under 80°. With such a configuration, when disposing the collector body portion 6a on the insulating plate 43 and when disposing the collector extension portion 6b on an insulating member extension portion 10e of the insulating member 10, even if there is a variation in the height of the current breaking mechanism 40, the height variation can be absorbed. Furthermore, even if there is a force pulling the positive electrode tab portions 4c towards the electrode body 3 side, the force can be absorbed and load on the collector body portion 6a can be reduced. Note that the angle θ1 and the angle θ2 may each be 90°.

An angle θ3 of the collector connection 6c against the collector extension portion 6b after the collector connection 6c has been bent back with respect to the collector extension portion 6b is preferably 60° or smaller, more preferably, 45° or smaller, and more preferably, 15° or smaller. With the above, the collector connection 6c can be disposed inside the prismatic outer package 1 in an efficient manner and the prismatic secondary battery becomes further high in energy density. Note that the angle θ3 is an angle formed between a surface of the collector connection 6c facing the collector extension portion 6b and a surface of the collector extension portion 6b facing the collector connection 6c. Furthermore, by increasing the radius of the bending-back portion 70a, the angle θ3 may be 0° or smaller. However, preferably, the angel θ3 is −15° or larger.

Note that it is desirable that the positive electrode collector 6 is made of aluminum or an aluminum alloy. In a state in which the collector connection 6c is bent back with respect to the collector extension portion 6b and the positive electrode collector 6 is made of aluminum or an aluminum alloy that is relatively softer than copper and the like, the bending-back portion 70a can be provided with elasticity. With such a configuration, even if the positive electrode tab portions 4c are pulled towards the electrode body 3 side, the load can be absorbed by the bending-back portion 70a such that load can be suppressed from being added on the fragile portion and the like. In order to obtain such an effect, the thickness of the positive electrode collector 6 is preferably 2.0 mm or under, more preferably, 1.5 mm or under, and more preferably, 1.2 mm or under. However, since the positive electrode collector 6 needs to be rigid to a certain extent, preferably, the thickness of the positive electrode collector 6 is 0.5 mm or more. Note that the thickness of the positive electrode collector 6 is the thickness of the base material portion where no thin wall portion, groove portion, and other portions are formed.

However, when the length W2 of the collector connection 6c is to be considerably small, the angle θ3 may be substantially 90° (about 70° to about 110°, for example).

In the prismatic secondary battery 20, the insulating member second side wall 10d of the insulating member 10 is disposed between the conductive member 41 and the collector connection portion 6d. Accordingly, a conductive path between the conductive member 41 and the collector connection portion 6d can be prevented from becoming formed after activation of the current breaking mechanism 40.

In the prismatic secondary battery 20, the flat gas discharge valve 17 is provided in the sealing plate 2. Furthermore, the flat gas discharge valve 17 is disposed so that the major axis thereof extends in the short direction of the sealing plate 2. Accordingly, even if a gas discharge valve 17 with a large area is provided in the sealing plate 2, the collector extension portion 6b and the like hindering the discharge of gas can be prevented.

First Modification

Figure 16:
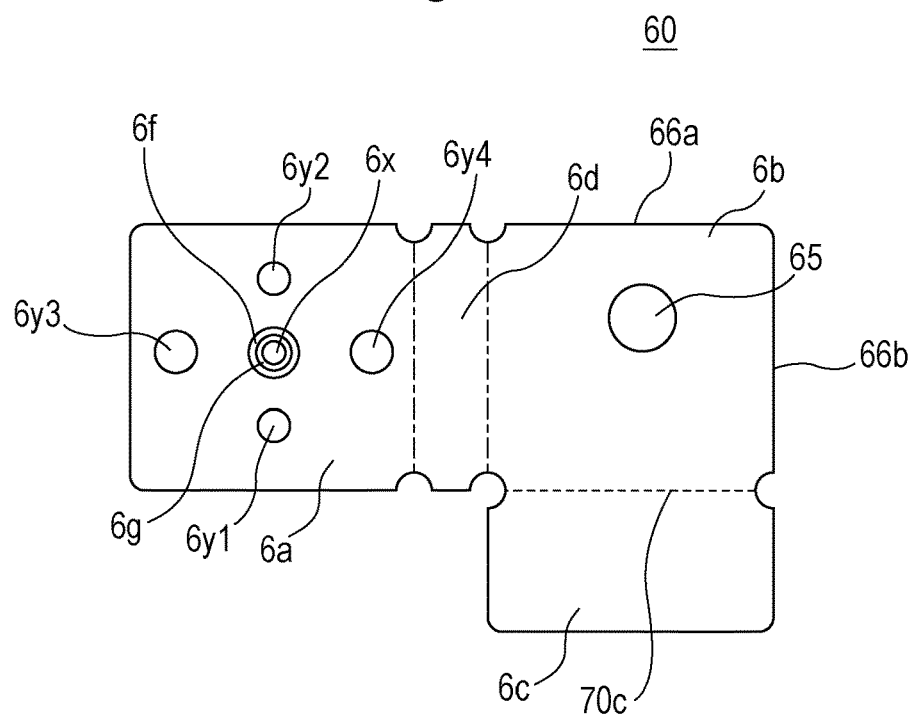
FIG. 16 is a plan view of a positive electrode collector according to a modification before bending.

FIG. 16 is a plan view of a positive electrode collector 60 before bending used in a prismatic secondary battery according to a first modification, and illustrates a surface thereof on the electrode body 3 side. Basically, the positive electrode collector 60 has a configuration that is similar to that of the positive electrode collector 6. In FIG. 16, components that are the same as those of the positive electrode collector 6 will be denoted with the same reference numeral as those of the positive electrode collector 6. The positive electrode collector 60 is different from the positive electrode collector 6 in that an extension portion fixing hole 65 is provided in the collector extension portion 6b.

Figure 17:
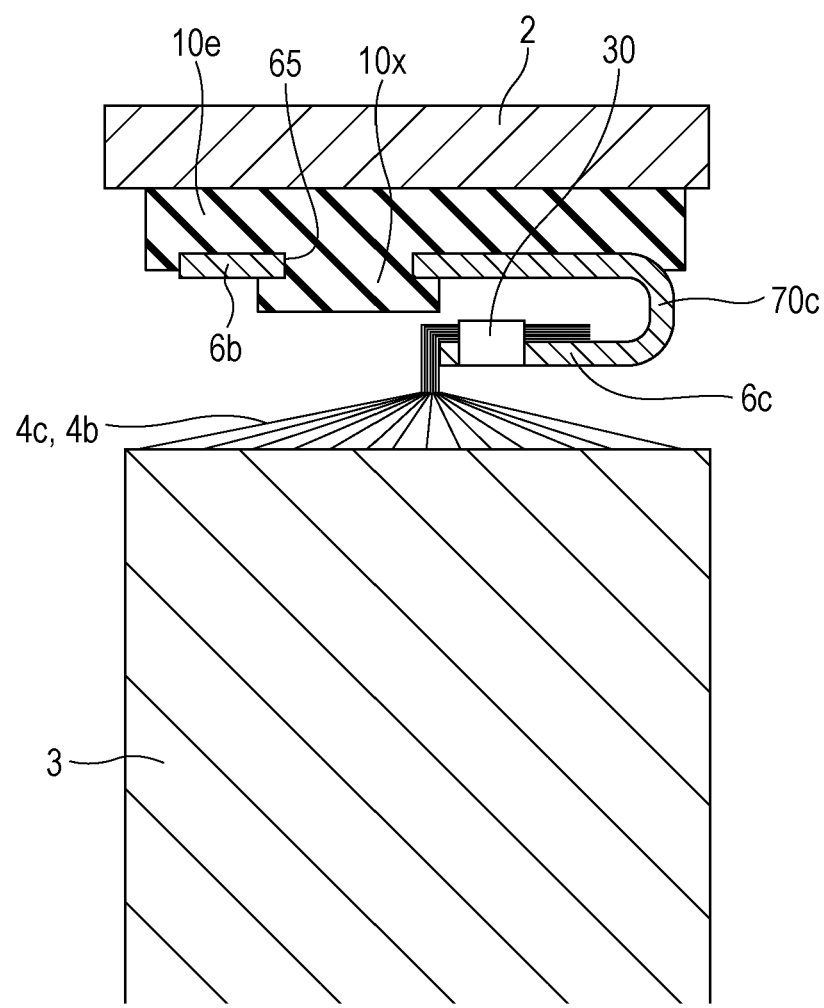
FIG. 17 is a diagram of a prismatic secondary battery according to a modification, corresponding to FIG. 12.
Figure 18:
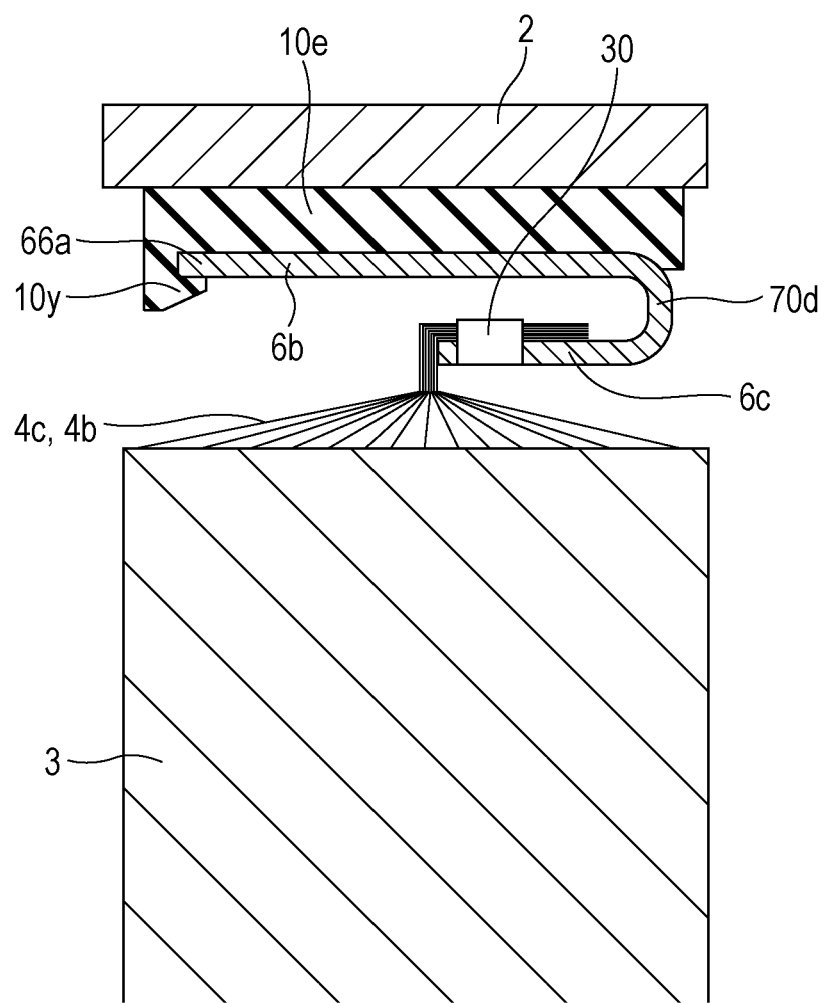
FIG. 18 is a diagram of a prismatic secondary battery according to a modification, corresponding to FIG. 12.

As illustrated in FIG. 17, in the prismatic secondary battery according to the first modification, the insulating member 10 that is disposed between the positive electrode collector 60 and the sealing plate 2 includes a fixing projection 10x. The fixing projection 10x is inserted in the extension portion fixing hole 65 of the collector extension portion 6b. Furthermore, the diameter of the tip of the fixing projection 10x is expanded. With the above, the collector extension portion 6b and the insulating member 10 are fixed to each other. With such a configuration, even if there is force pulling the positive electrode tab portions 4c towards the electrode body 3 side, load to the fragile portion formed in the collector body portion 6a and the connection between the deformation plate 42 and the collector body portion 6a can be suppressed such that the fragile portion and the connection between the deformation plate 42 and the collector body portion 6a can be prevented, in a more reliable manner, from becoming damaged or broken.

Note that instead of the configuration disclosed in FIG. 17, a hooking and fixing portion 10y may be provided, in the insulating member 10, and the collector extension portion 6b may be fixed to the insulating member 10 by hooking the hooking and fixing portion 10y to an edge 66a of the collector extension portion 6b illustrated in FIG. 16. Alternatively, the hooking and fixing portion of the insulating member 10 may be hooked to an edge 66b of the collector extension portion 6b illustrated in FIG. 16.

Second Modification

Figure 19:
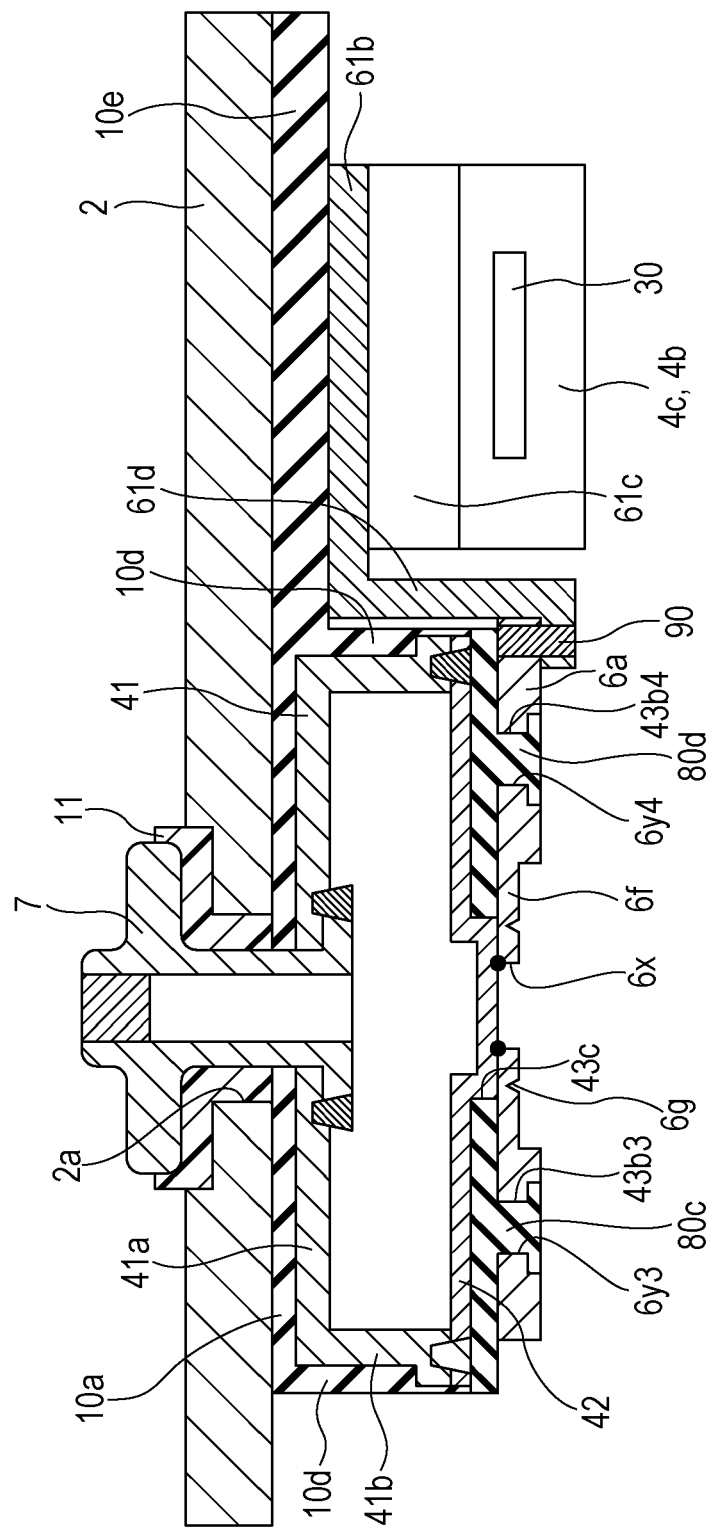
FIG. 19 is a diagram of a prismatic secondary battery according to a modification, corresponding to FIG. 8.

FIG. 19 is a cross-sectional view of a prismatic secondary battery according to a second modification and is a diagram corresponding to FIG. 8. As illustrated in FIG. 19, the collector body portion 6a, and a collector connection portion 61d, a collector extension portion 61b, and a collector connection 61c of the positive electrode collector 6 may be separate components. In such a case, the distal end side of the collector connection portion 61d may be joined to the collector body portion 6a. With the above, a joint portion 90 is formed.

Third Modification

Figure 20:
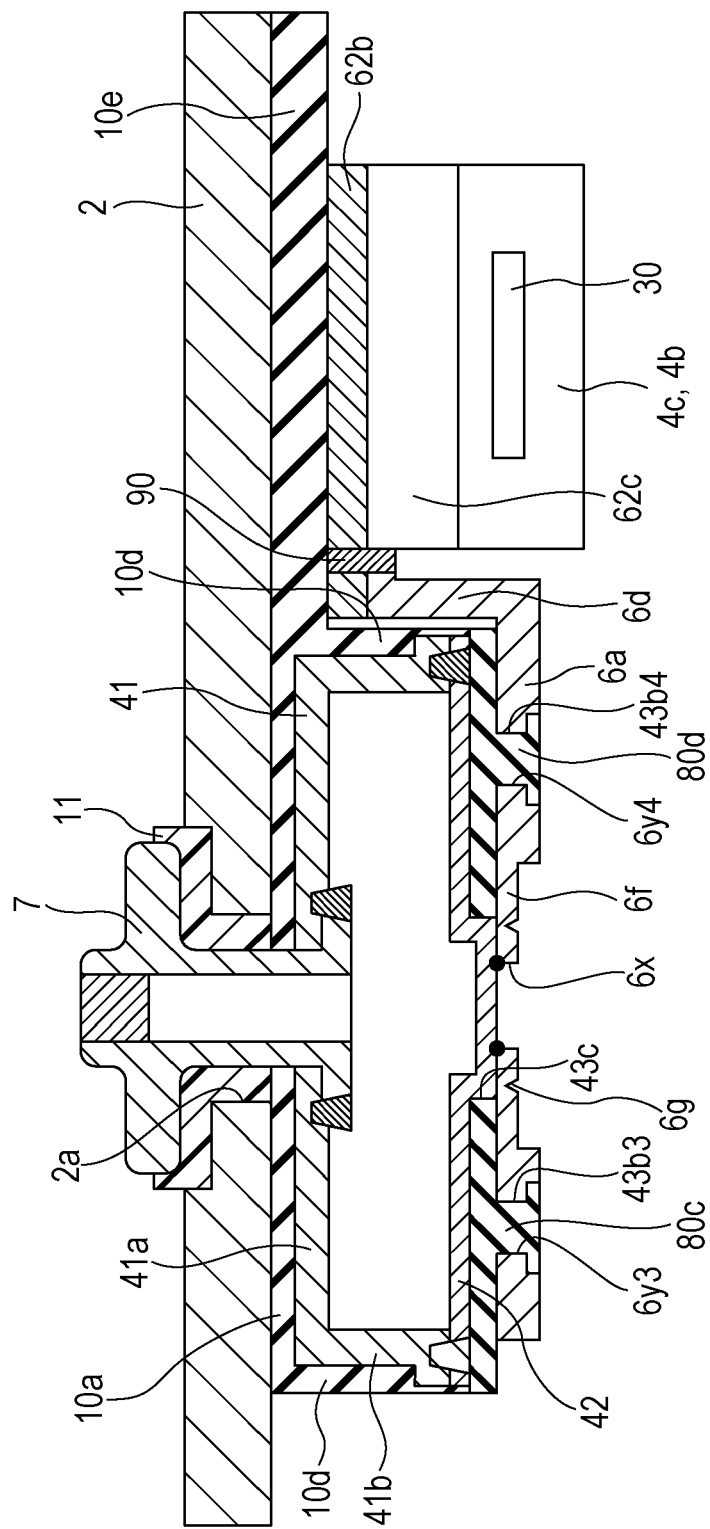
FIG. 20 is a diagram of a prismatic secondary battery according to a modification, corresponding to FIG. 8.

FIG. 20 is a cross-sectional view of a prismatic secondary battery according to a third modification and is a diagram corresponding to FIG. 8. As illustrated in FIG. 20, the collector body portion 6a and a collector connection portion 6d, and a collector extension portion 62b and a collector connection 62c of the positive electrode collector 6 may be separate components. In such a case, the distal end side of the collector connection portion 6d may be joined to the collector extension portion 62b. With the above, a joint portion 90 is formed.

Others

Desirably, an overcharge inhibitor, which generates gas when the battery becomes overcharged, is included in the battery. In a case of a nonaqueous electrolyte secondary battery, desirably, lithium carbonate is included in the positive electrode active material layers or cyclohexylbenzene or the like is included in the nonaqueous electrolyte.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only and is not intended to limit the invention.

What is claimed is:

1. A prismatic secondary battery, comprising:
   a positive electrode plate that includes a positive electrode tab portion;
   a negative electrode plate that includes a negative electrode tab portion;
   an electrode body that includes the positive electrode plate and the negative electrode plate;
   a prismatic outer package that includes an opening and that houses the electrode body;
   a sealing plate that seals the opening;
   a positive electrode terminal electrically connected to the positive electrode plate, the positive electrode terminal being attached to the sealing plate;
   a negative electrode terminal electrically connected to the negative electrode plate, the negative electrode terminal being attached to the sealing plate; and
   a pressure-sensitive current breaking mechanism provided in a conductive path between the positive electrode plate and the positive electrode terminal or in a conductive path between the negative electrode plate and the negative electrode terminal, wherein
   the positive electrode tab portion and the negative electrode tab portion are disposed at an end portion of the electrode body on a sealing plate side,
   the current breaking mechanism includes a conductive member having an opening portion on an electrode body side, a deformation plate that seals the opening portion, and a collector that is connected to the deformation plate,
   the conductive path between the positive electrode plate and the positive electrode terminal or the conductive path between the negative electrode plate and the negative electrode terminal is disconnected upon breakage of a fragile portion caused by deformation of the deformation plate deforming when a pressure inside the battery is equivalent to or above a predetermined value,
   the collector includes a collector body portion that is disposed on the electrode body side of the deformation plate and that is connected to the deformation plate, a collector extension portion positioned on the sealing plate side with respect to the collector body portion, a collector connection portion connecting the collector body portion and the collector extension portion, and a collector connection that is bent at an end portion of the collector extension portion,
   the positive electrode tab portion or the negative electrode tab portion is connected to the collector connection, and
   the collector itself is bent.

2. The prismatic secondary battery according to claim 1, wherein
   the collector extension portion is disposed at a position offset with respect to the collector body portion in a longitudinal direction of the sealing plate.

3. The prismatic secondary battery according to claim 1, wherein
   the collector connection is bent back at the end portion of the collector extension portion, the end portion of the collector extension portion where the collector connection is bent is adjacent to an end of the collector extension portion, in a direction parallel to a short side of the sealing plate, and
   an angle formed between surfaces of the collector extension portion and the collector connection is 45° or smaller.

4. The prismatic secondary battery according to claim 1, wherein
   the collector connection is bent at the end portion of the collector extension portion and extends towards the electrode body,
   an angle formed between surfaces of the collector extension portion and the collector connection is 70° to 110°, and
   the end portion of the collector extension portion where the collector connection is bent is adjacent to an end of the collector extension portion, in a direction parallel to a short side of the sealing plate.

5. The prismatic secondary battery according to any one of claim 1, wherein
   the collector includes a collector connection portion that connects the collector body portion and the collector extension portion to each other, and
   the collector connection portion is inclined with respect to the collector body portion and is inclined with respect to the collector extension portion.

6. The prismatic secondary battery according to claim 5, wherein
   an insulating member is disposed between the sealing plate and the conductive member,
   the insulating member includes a wall disposed between the conductive member and the collector connection portion, and
   the wall extends toward the electrode body in a direction away from the insulating member.

7. The prismatic secondary battery according to any one of claim 1, wherein
   an insulating member is disposed between the sealing plate and the collector extension portion,
   the insulating member includes a fixing projection that contacts a surface of the collector extension portion facing toward the electrode body, and
   the insulating member and the collector extension portion are fixed together via the fixing projection.

8. The prismatic secondary battery according to claim 1, wherein
the fragile portion is provided in the collector body portion.

9. The prismatic secondary battery according to claim 1, wherein
the positive electrode plate includes a positive electrode core body,
the positive electrode tab portion is included in the positive electrode core body,
the electrode body comprises a plurality of the positive electrode tab portions, the positive electrode tab portions being stacked one atop another and welded together to the collector connection.

10. The prismatic secondary battery according to claim 1, further comprising:
an insulating member,
the insulating member includes a wall disposed between the conductive member and the collector connection portion, and
the wall extends substantially perpendicular to the sealing plate.

11. The prismatic secondary battery according to claim 1, wherein
the collector includes a first collector, and a second collector different from the first collector,
the first collector and the second collector are joined to each other at a joint portion,
the first collector includes the collector body portion, and
the second collector includes the collector extension portion and the collector connection.

12. The prismatic secondary battery according to claim 1, wherein the collector is bent at a bending-back portion such that a portion of the collector extension portion faces a portion of the collector connection.

13. The prismatic secondary battery according to claim 12, wherein the bending back portion is disposed adjacent to an end of the collector extension portion, in a direction parallel to a short side of the sealing plate, and
an angle formed between surfaces of the collector extension portion and the collector connection is 45° or smaller.

14. The prismatic secondary battery according to claim 12, wherein
the collector connection extends towards the electrode body,
an angle formed between surfaces of the collector extension portion and the collector connection is 70° to 110°, and
wherein the bending-back portion is disposed adjacent to an end of the collector extension portion, in a direction parallel to a short side of the sealing plate.

15. A prismatic secondary battery, comprising:
a positive electrode plate that includes a positive electrode tab portion;
a negative electrode plate that includes a negative electrode tab portion;
an electrode body that includes the positive electrode plate and the negative electrode plate;
a prismatic outer package that includes an opening and that houses the electrode body;
a sealing plate that seals the opening;
a positive electrode terminal electrically connected to the positive electrode plate, the positive electrode terminal being attached to the sealing plate;
a negative electrode terminal electrically connected to the negative electrode plate, the negative electrode terminal being attached to the sealing plate; and
a pressure-sensitive current breaking mechanism provided in a conductive path between the positive electrode plate and the positive electrode terminal or in a conductive path between the negative electrode plate and the negative electrode terminal, wherein
the positive electrode tab portion and the negative electrode tab portion are disposed at an end portion of the electrode body on a sealing plate side,
the current breaking mechanism includes a conductive member having an opening portion on an electrode body side, a deformation plate that seals the opening portion, and a collector that is connected to the deformation plate,
the conductive path between the positive electrode plate and the positive electrode terminal or the conductive path between the negative electrode plate and the negative electrode terminal is disconnected upon breakage of a fragile portion caused by deformation of the deformation plate deforming when a pressure inside the battery is equivalent to or above a predetermined value,
the collector includes a collector body portion that is disposed on the electrode body side of the deformation plate and that is connected to the deformation plate, a collector extension portion positioned on the sealing plate side with respect to the collector body portion, and a collector connection that is bent at a distal end portion of the collector extension portion,
the positive electrode tab portion or the negative electrode tab portion is connected to the collector connection, and
the collector itself is bent.

16. The prismatic secondary battery according to claim 15, wherein
the collector connection is bent back at the distal end portion of the collector extension portion, in a direction parallel to a short side of the sealing plate, and
an angle formed between surfaces of the collector extension portion and the collector connection is 45° or smaller.

17. The prismatic secondary battery according to claim 15, wherein
the collector connection is bent at the distal end portion of the collector extension portion, in a direction parallel to a short side of the sealing plate, and extends towards the electrode body, and
an angle formed between surfaces of the collector extension portion and the collector connection is 70° to 110°.

18. The prismatic secondary battery according to claim 15, wherein
the positive electrode plate includes a positive electrode core body, the positive electrode tab portion is included in the positive electrode core body,
the electrode body comprises a plurality of the positive electrode tab portions, the positive electrode tab portions being stacked one atop another and welded together to the collector connection.

19. The prismatic secondary battery according to claim 15, further comprising:
an insulating member,
the insulating member includes a wall disposed between the conductive member and the collector connection portion, and the wall extends substantially perpendicular to the sealing plate.

20. The prismatic secondary battery according to claim 15, wherein the collector is bent at a bending-back portion such that a portion of the collector extension portion faces a portion of the collector connection.

21. The prismatic secondary battery according to claim 20, wherein the bending back portion is disposed adjacent to the distal end of the collector extension portion, in a direction parallel to a short side of the sealing plate, and
- an angle formed between surfaces of the collector extension portion and the collector connection is 45° or smaller.

* * * * *